(12) United States Patent
Zavatone

(10) Patent No.: US 8,701,090 B2
(45) Date of Patent: Apr. 15, 2014

(54) GRAPHICAL USER INTERFACE TESTING SYSTEMS AND METHODS

(75) Inventor: Alex Zavatone, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 512 days.

(21) Appl. No.: 12/983,114

(22) Filed: Dec. 31, 2010

(65) Prior Publication Data
US 2012/0174069 A1    Jul. 5, 2012

(51) Int. Cl.
*G06F 9/44* (2006.01)

(52) U.S. Cl.
USPC ............ 717/124; 717/125; 717/126; 717/135

(58) Field of Classification Search
None
See application file for complete search history.

(56) References Cited

U.S. PATENT DOCUMENTS

| | | | | |
|---|---|---|---|---|
| 6,968,509 | B1 * | 11/2005 | Chang et al. ................... | 715/802 |
| 7,395,456 | B2 * | 7/2008 | Klementiev et al. .......... | 717/124 |
| 7,840,970 | B2 * | 11/2010 | Liang .............................. | 717/125 |
| 8,225,140 | B2 * | 7/2012 | Couldwell et al. ............ | 714/38.1 |
| 2005/0268285 | A1 * | 12/2005 | Bagley et al. .................. | 717/124 |
| 2006/0156287 | A1 * | 7/2006 | Vikram .......................... | 717/124 |
| 2008/0155514 | A1 * | 6/2008 | Couldwell et al. ............. | 717/135 |
| 2010/0251217 | A1 * | 9/2010 | Miller ............................. | 717/126 |
| 2011/0307865 | A1 * | 12/2011 | Grieves et al. ................. | 717/124 |
| 2012/0023484 | A1 * | 1/2012 | Demant et al. ................. | 717/125 |

OTHER PUBLICATIONS

Atif M. Memon et al., Hierarchical GUI Test Case Generation Using Automated Planning, 2001 IEEE, pp. 144-155, <http://ieeexplore.ieee.org/stamp/stamp.jsp?tp=&arnumber=908959>.*

Lee White et al., Generating Test Cases for GUI Responsibilities Using Complete Interaction Sequences, 2000 IEEE, pp. 110-121, <http://ieeexplore.ieee.org/stamp/stamp.jsp?tp=&arnumber=885865>.*

Atif M. Memon, GUI Testing Pitfalls and Process, 2002 IEEE, pp. 87-88, <http://cvs.cs.umd.edu/~atif/papers/MemonIEEEComputer2002.pdf>.*

Atif M. Memon, Studying the Fault-Detection Effectiveness of GUI Test Cases for Rapidly Evolving Software, 2005 IEEE, pp. 884-896, <http://ieeexplore.ieee.org/stamp/stamp.jsp?tp=&arnumber=1542069>.*

Xun Yuan et al., Alternating GUI Test Generation and Execution, 2008 IEEE, pp. 23-32, <http://ieeexplore.ieee.org/stamp/stamp.jsp?tp=&arnumber=4670297>.*

Zhu Xiaochun et al., A Test Automation Solution on GUI Functional Test, 2008 IEEE, pp. 1413-1418, <http://ieeexplore.ieee.org/stamp/stamp.jsp?tp=&arnumber=4618325>.*

* cited by examiner

*Primary Examiner* — Thuy Dao
*Assistant Examiner* — Cuong V Luu

(57) ABSTRACT

An exemplary method includes graphical user interface code executing on a computing device providing a graphical user interface including one or more graphical elements and exposing data associated with the graphical user interface for access and use by a testing subsystem to test the graphical user interface. In certain examples, the exposed data is representative of one or more graphical element type identifiers indicating one or more types of the one or more graphical elements included in the graphical user interface. In certain examples, the exposed data is included in a log of events associated with the graphical user interface. In certain examples, the exposed data is exposed in response to a query from the testing subsystem. Corresponding systems and methods are also disclosed.

18 Claims, 9 Drawing Sheets

GRAPHICAL USER INTERFACE TESTING SYSTEMS AND METHODS

BACKGROUND INFORMATION

The proliferation of computing devices in modern society has challenged designers, developers, and testers of graphical user interfaces for the computing devices. For example, the competitive landscapes between manufacturers of computing devices, between providers of applications that run on computing devices, and between providers of services accessed through the computing devices have pushed designers, developers, and testers of graphical user interfaces to design, develop, and test graphical user interfaces as efficiently as possible without sacrificing quality.

Traditional processes for design, development, and testing of graphical user interfaces have not kept pace with the demands placed on the designers, developers, and testers of the graphical user interfaces. To illustrate, in a traditional design and development process, a designer utilizes a graphical user interface design tool to design a screen layout of graphical elements to be included in a graphical user interface. Once the design is complete, the designer provides information about the screen layout of graphical elements to a developer who is responsible for producing computing code configured to be executed by a computing device to render a graphical user interface that includes the screen layout of graphical elements designed by the designer. The computing code produced by the developer is then typically provided to a tester for quality assurance testing. The tester is responsible for testing the computing code to ensure that the graphical user interface functions as intended.

Unfortunately, testing tools and methodologies traditionally available to a tester of conventional graphical user interface code require significant manual labor by the tester, are often less effective (e.g., prone to human error), and/or require significant resources and expense. For instance, conventional graphical user interface code does not provide an integrated testing framework that can be leveraged to facilitate effective and efficient testing of the GUI provided by the code. Consequently, the tester must expend time and resources to create testing tools capable of interfacing with conventional graphical user interface code. Such conventional testing tools are limited in how they can interface with the graphical user interface code, and this limitation has resulted in development of rudimentary and/or less effective testing tools. For example, a common testing methodology requires that the tester manually provide input to interact with the graphical user interface code, view a display of a graphical user interface provided in response to the interaction, and analyze the display to identify any perceived error. Such reliance on manual input and analysis by a tester is labor intensive and creates significant opportunity for human error.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary graphical user interface ("GUI") testing systems and methods are described herein. The exemplary systems and methods may provide a testing framework configured to facilitate efficient and/or effective testing of a GUI provided by GUI code executing on a computing device. The testing framework, which may be provided by the GUI code, may be leveraged by a testing subsystem to perform one or more testing operations to test the GUI, as described herein.

As used herein, the term "GUI code" may refer to a set of computing instructions and/or data stored in at least one computer-readable medium and that may be executed and/or otherwise processed by a computing device to provide a GUI. The set of computing instructions and/or data may include or be implemented by one or more computing applications (e.g., one or more software and/or firmware applications), source code, compiled code, object code, executable code, data structures, or any combination or sub-combination thereof. An example of GUI code is described in detail below.

As used herein, the term "testing framework" may refer to a set of computing instructions and/or data that are included in and/or exposed by GUI code and that may be leveraged for testing of a GUI. The testing of the GUI may include a testing subsystem performing one or more operations configured to test the GUI, which may include testing the GUI code executing on a computing device to provide the GUI, testing one or more graphical elements and/or GUI screens included in the GUI, and/or testing functionality of the GUI. Exemplary testing frameworks, including examples of testing framework data and/or testing framework computing instructions (e.g., testing framework functions) included in and/or provided by GUI code, are described in detail below.

Exemplary GUI testing systems and methods will now be described in reference to the drawings.

Figure 1:
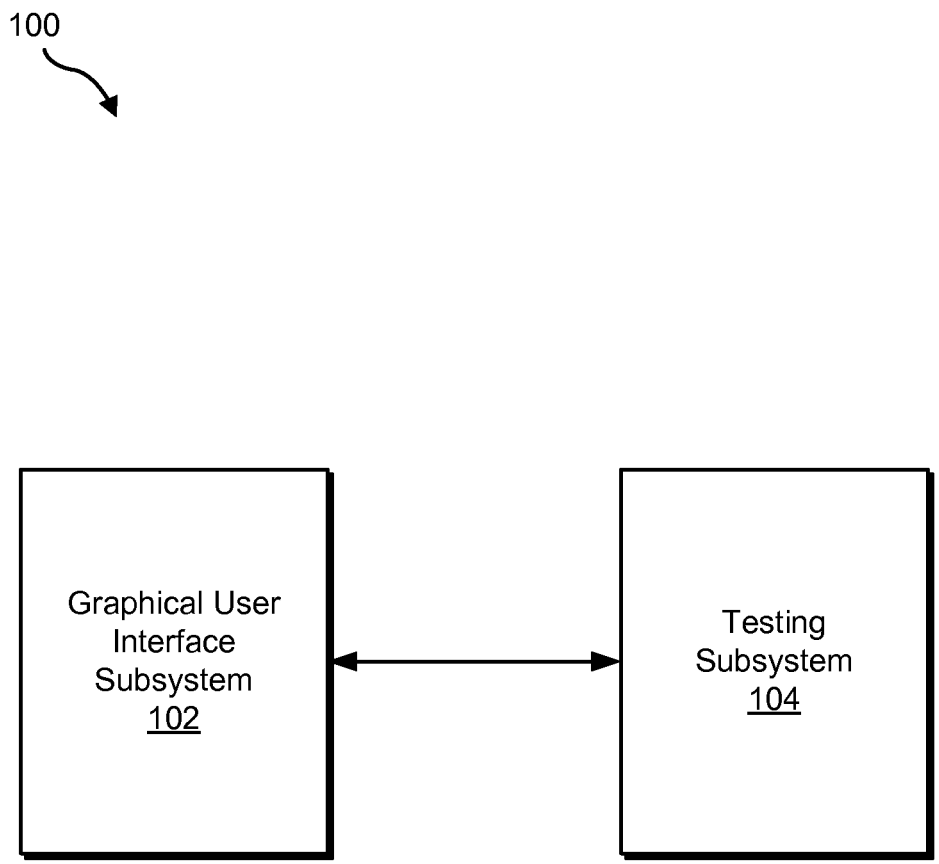
FIG. 1 illustrates an exemplary graphical user interface testing system according to principles described herein.

FIG. 1 illustrates an exemplary GUI testing system 100 (or simply "system 100"). As shown in FIG. 1, system 100 may include a GUI subsystem 102 and a testing subsystem 104 configured to communicate or otherwise interface with one another as shown. GUI subsystem 102 and testing subsystem 104 may interface with one another in any suitable way and/or using any suitable technologies, such as described herein.

GUI subsystem 102 may be configured to provide a GUI with which a user may interact. GUI subsystem 102 may employ any suitable technologies for providing the GUI and supporting user interaction with the GUI. For example, GUI subsystem 102 may include GUI code and one or more computing devices configured to execute and/or otherwise process the GUI code to provide the GUI (e.g., render one or more screens of the GUI), GUI functionality, and/or support for user interaction with the GUI. As described in detail herein, in addition to providing GUI functionality for the GUI, the GUI code may be configured to provide a testing framework configured to facilitate efficient and/or effective testing of the GUI.

Figure 2:
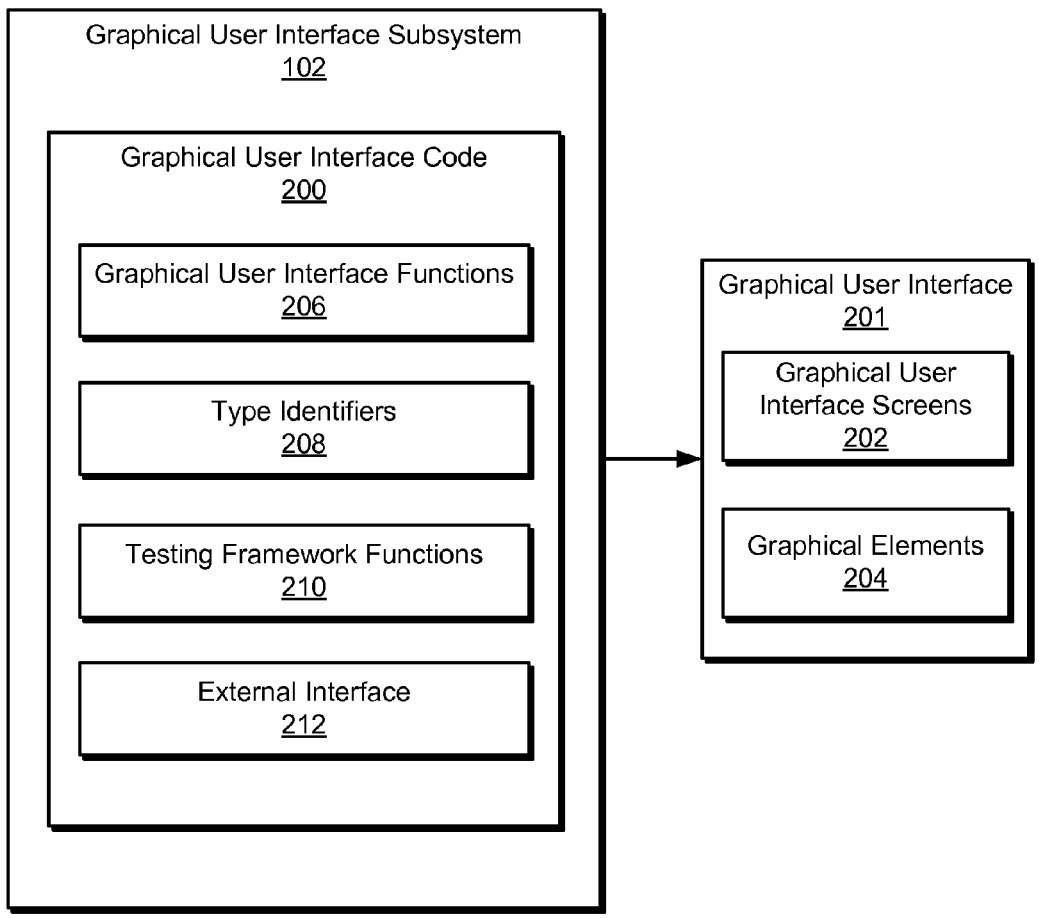
FIG. 2 illustrates exemplary graphical user interface code configured to provide a testing framework according to principles described herein.

FIG. 2 illustrates GUI subsystem 102 including exemplary GUI code 200 configured to provide a GUI such as GUI 201. GUI code 200 may be executed or otherwise processed by a computing device, which may be included in or external to GUI subsystem 102, to provide the GUI. Data representative of GUI code 200 may be stored in a non-transitory computer-readable medium accessible by the computing device.

The GUI provided by GUI code 200 may include one or more GUI screens 202. Each GUI screen 202 may be configured to be displayed on a display screen for viewing by a user. Typically, one GUI screen 202 is displayed in a display window at a time. To this end, each GUI screen 202 may be selectively rendered for display and dismissed from being displayed by GUI code 200.

The GUI provided by GUI code 200 may include one or more graphical elements 204. Typically, each GUI screen 202 within the GUI may include one or more graphical elements 204 visually laid out within the GUI screen 202. A graphical element 204 may include any element that may be visually displayed within a GUI screen 202. For example, a graphical 204 element may include one or more graphics, text, or a combination of text and one or more graphics that may be displayed within a GUI screen 202. Examples of graphical elements 204 may include, without limitation, a scrollbar, a navigation arrow, a button, a selector, a selectable menu option, a text field, a dialog window, and any other graphic and/or text. GUI code 200 may include data representative of unique identifiers for graphical elements included in the GUI provided by GUI code 200. Accordingly, each graphical element may be addressable and may have specific functionality associated therewith.

Graphical elements 204 within the GUI may be of different types. For example, the GUI may include static and non-static type graphical elements. A static type graphical element may include a graphical element configured simply to be displayed but not configured to be interacted with or to invoke GUI functionality in response to an interaction therewith. A non-static type graphical element may include a graphical element that is actionable, i.e., the graphical element may be configured to be interacted with and to invoke GUI functionality associated with the graphical element in response to an interaction with the graphical element. For example, GUI code 200 may be configured to detect a message indicative of an interaction with an actionable graphical element and to invoke a performance of one or more functions associated with the interaction with the graphical element in response to the message.

Additionally or alternatively, graphical elements 204 within the GUI may be of different types or sub-types such as, without limitation, button type, dialog type, and/or text field type graphical elements. A button type graphical element may be configured to be selected by a user through the GUI. In response to a selection of the button type graphical element, one or more GUI functions associated with the selection of the button may be performed. A dialog type graphical element may be configured to facilitate a dialog between the GUI and a user of the GUI. A text field type graphical element may be configured to receive entry of text by a user through the GUI. In response to the text entry, one or more GUI functions associated with the entry of the text in the graphical element may be performed.

Additionally or alternatively, graphical elements 204 within the GUI may have different statuses. For example, graphical elements 204 may be enabled to be interacted with and to provide GUI functionality in response to interaction or disabled from being interacted with and providing GUI functionality in response to interaction. For example, a button may be enabled during a particular state of operation of the GUI and disabled during a different state of operation of the GUI.

These examples are illustrative only. Other types, sub-types, and/or statuses of graphical elements may be defined and represented in GUI code 200.

GUI code 200 may include one or more defined GUI functions 206, which may include computing instructions that may be performed to provide functionality of the GUI. Exemplary GUI functions 206 may include, without limitation, GUI navigation functions (e.g., functions for navigating between GUI screens 202, options, graphical elements 204, etc.), functions for rendering GUI screens 202 for display (e.g., a "screen draw" function), functions for dismissing GUI screens 202 from being displayed, functions for providing a dialog for display in the GUI, and any other functions or types of functions for performing typical GUI functionality.

The GUI functions 206 may be performed by GUI code 200 executing on a computing device in response to any predefined trigger. For example, one or more of GUI functions 206 may be configured to be performed in response to detected interactions with GUI code 200, the GUI provided by GUI code 200, and/or actionable graphical elements 204 in the GUI. Such interactions may be initiated by any suitable sources, such as sources internal to GUI code 200 (e.g., by an automated process in GUI code 200 that checks for available updates to GUI code 200) and/or sources external to GUI code 200 (e.g., by a user providing input through the GUI to interact with functionality provided by GUI code 200, by a server pushing an update to GUI code 200, by testing subsystem 104 providing one or more messages to interact with GUI code 200, and/or by a computing application and/or device providing messages to interact with GUI code 200).

GUI code 200 may include data representative of type identifiers 208, which may indicate types of elements included in the GUI and/or functions included in GUI code 200. For example, GUI code 200 may include graphical element type identifiers indicating types of the graphical elements 204 included in the GUI provided by GUI code 200. For instance, GUI code 200 may include one or more graphical element type identifiers indicating which graphical elements are actionable graphical elements, buttons, dialog windows, text fields, etc.

Additionally or alternatively, type identifiers 208 may include GUI function type identifiers indicating the functions and/or types of the GUI functions 206 included in GUI code 200. For instance, GUI code may include one or more GUI function type identifiers indicating a screen draw function, a screen dismiss function, a button select function, a screen navigate function, a text entry function, a dialog function, and/or any other function or type of function included in GUI functions 206.

Additionally or alternatively, GUI code 200 may include data representative of statuses of graphical elements. For example, GUI code 200 executing on a computing device to provide the GUI may include data indicating whether graphical elements are enabled and/or disabled.

The type identifiers 208 and/or status identifiers for graphical elements 204 and/or GUI functions 206 may be included in GUI code 200 in any suitable data format. In certain implementations, for example, unique identifiers for the graphical elements 204 may be the names of the graphical elements 204, and graphical element type identifiers may be indicators associated with the names of the graphical elements 204 (e.g., indicators inserted within or appended as prefixes or suffixes to the names).

Data representative of graphical elements 204 included in the GUI and/or GUI functions 206 included in GUI code 200, including type identifiers 208 for the graphical elements 204 and/or GUI functions 206, may provide at least part of a testing framework that may be provided by GUI code 200 and leveraged by testing subsystem 104 to test the GUI provided by GUI code 200. For example, as described herein, data representative of type identifiers 208 may be exposed by GUI code 200 for access and use by testing subsystem 104 to test the GUI. Examples of ways in which testing subsystem 104 may leverage exposed type identifiers 208 for testing purposes are described in herein.

In addition to GUI functions 206, GUI code 200 may include one or more defined testing framework functions 210, which may include one or more functions configured to be performed to provide a testing framework that may be leveraged to test the GUI provided by GUI code 200. Similar to GUI functions 206, testing framework functions 210 may be performed in response to detected interactions with GUI code 200, the GUI provided by GUI code 200, and/or actionable graphical elements 204 in the GUI. Such interactions may be initiated by any suitable sources, including any of the sources mentioned above.

In certain implementations, testing framework functions 210 may include a "log event" function configured to cause data representative of one or more events associated with the GUI provided by GUI code 200 to be recorded into a log of events. As used herein, an "event" may refer to any detection, function, or other operation performed by GUI code 200. The log event function may be associated with one or more actionable graphical elements 204 and/or GUI functions 206 included in the GUI such that the log event function may be invoked to record data representative of one or more events associated with the one or more actionable graphical elements 204 and/or GUI functions 206 included in the GUI. For example, the log event function may record events such as detected interactions with the GUI (e.g., interactions with one or more actionable graphical elements 204 in the GUI) and/or performance of one or more GUI functions 206.

An entry in a recorded log of events generated by GUI code 200 may include data that is potentially useful to facilitate testing of GUI code 200. In some examples, an entry in the log of events may correspond to and represent a detected interaction with the GUI and/or a performance of one or more GUI functions 206 (e.g., one or more GUI functions 206 performed in response to the detected interaction). In certain implementations, an entry in the log of events may include data representative of a time of an event (e.g., an elapsed amount of time from the time GUI code 200 is launched to when the event occurred), an identifier of a graphical element 204 associated with the event (e.g., an identifier of a graphical element 204 associated with an interaction), a type identifier 208 indicating a type of the event, a type identifier 208 indicating the type of the graphical element 204 associated with the event (e.g., a type identifier indicating a type of a graphical element 204 associated with an interaction), a type identifier 208 indicating a performed GUI function 206 (e.g., a GUI function 206 performed in response to an interaction), and/or any other data associated with the event. Accordingly, the recorded log of events may provide at least part of a testing framework that may be leveraged by testing subsystem 104 for testing the GUI provided GUI code 200.

Type identifiers 208, testing framework functions 210, and/or other components of GUI code 200 that provide a testing framework may be integrated in GUI code 200 in any suitable way. As an example, in certain implementations, testing framework functions 210 may be integrated separately within each actionable graphical element 204. Such a configuration may allow for a high degree of individual customization and/or autonomy of testing framework functionality for each graphical element 204. As another example, in certain implementations, testing framework functions 210 may be managed and called at a global level within GUI code 200. Such an implementation may conserve resources and simplify implementation when testing framework functions 210 are generic across and/or may be invoked for different graphical elements 204. Other integrations may be employed in other embodiments. For example, testing framework functions 210 may be managed and called by a manager implemented at any suitable level within GUI code 200, such as at a GUI screen level.

GUI code 200 may be configured to provide a testing framework that may be leveraged by testing subsystem 104 to test the GUI provided by GUI code 200 by exposing data for access and use by testing subsystem 104. To this end, as shown in FIG. 2, GUI code 200 may include an external interface 212 configured to expose data associated with the GUI provided by GUI code 200 to one more external entities, such as testing subsystem 104 and/or a tester of testing subsystem 104 for use in testing GUI code 200. As an example, external interface 212 may expose data representative of graphical element identifiers and/or graphical element type identifiers for access and use by testing subsystem 104. As another example, external interface 212 may expose data representative of GUI function identifiers and/or GUI function type identifiers for access and use by testing subsystem 104.

External interface 212 may be configured to expose data associated with the GUI provided by GUI code 200 in any suitable way. For example, external interface 212 may be configured to receive a query from testing subsystem 104 and respond to the query by exposing requested data (e.g., data representative of type identifiers 208 and/or graphical elements 204 of a certain type) to testing subsystem 104. As another example, external interface 212 may expose (e.g., export or otherwise output or save) data representative of a recorded log of events associated with the GUI for access and use by testing subsystem 104. The recorded log of events may include any of the data described above, which testing subsystem 104 may access and use to test the GUI. Such examples of exposed data may provide a testing framework that may be leveraged by testing subsystem 104 for testing the GUI provided by GUI code 200, as described herein.

In addition, external interface 212 may be configured to receive interactions from one or more external sources such as a user interacting with the GUI, from testing subsystem 104, and/or from a computing application and/or device external to GUI code 200. To this end, external interface 212 may be configured to provide one or more interfaces by which messages may be received from one or more external sources and/or by which testing subsystem 104 may interact with GUI code 200. Accordingly, through external interface 212, a user may provide input to interact with the GUI. In particular, the user may provide input to interact with (e.g., select) one or more actionable graphical elements within the GUI. To illustrate, a user may provide input to indicate a selection of a button displayed within a GUI screen 202. Additionally or alternatively, through external interface 206, testing subsystem 104 may provide one or more messages to interact with GUI code 200. In certain examples, the messages from testing subsystem 104 may simulate actual user interaction with the GUI provided by GUI code 200 (e.g., interaction with one or more graphical elements 204 included in the GUI).

External interface 206 may employ any suitable technologies to provide an external interface through which interaction with the GUI may be received and data may be exposed. In certain implementations, external interface 206 may include one or more public application program interfaces ("APIs").

As mentioned, testing subsystem 104 may be configured to leverage a testing framework provided by GUI code (e.g., GUI code 200) to conduct testing of a GUI provided by the GUI code. Testing subsystem 104 may include or be implemented on the same computing device or on a different computing device than the computing device executing the GUI code to provide a GUI.

Figure 3:
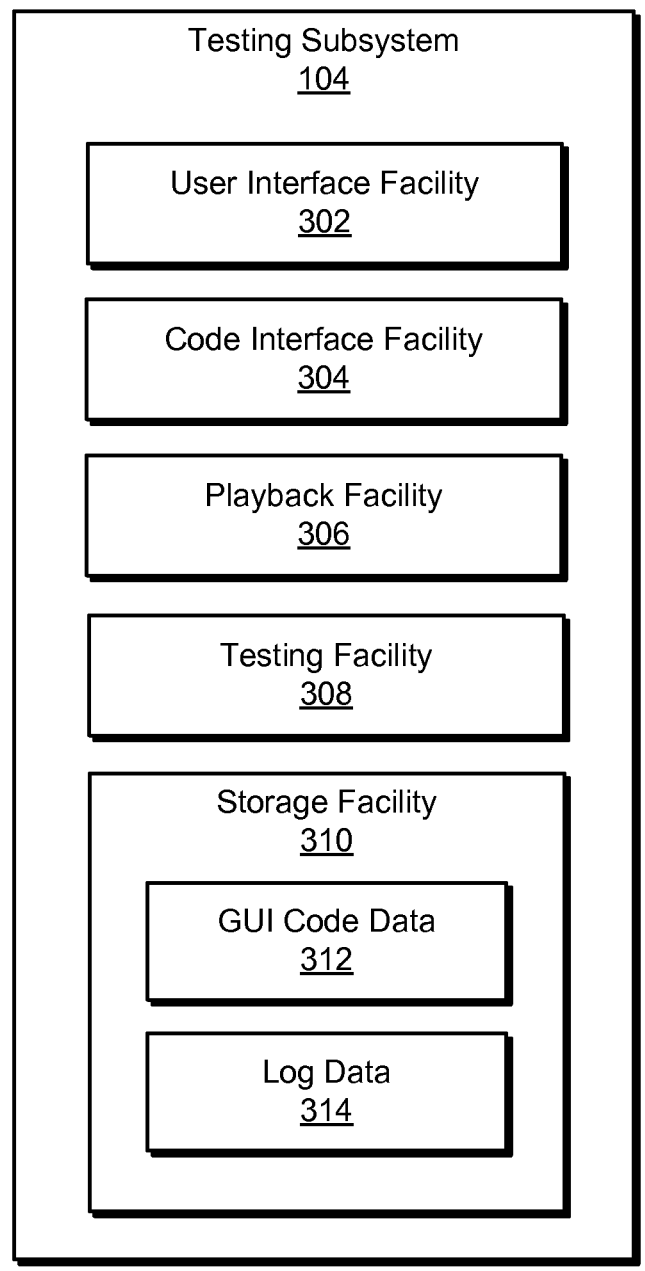
FIG. 3 illustrates exemplary components of a testing subsystem according to principles described herein.

FIG. 3 illustrates exemplary components of testing subsystem 104. As shown, testing subsystem 104 may include, without limitation, a user interface facility 302, a code interface facility 304, a playback facility 306, a testing facility 308, and a storage facility 310, which may be in communication with one another using any suitable communication technologies. It will be recognized that although facilities 302-310 are shown to be separate facilities in FIG. 3, any other facilities 302-310 may be combined into fewer facilities, such as into a single facility, or divided into more facilities as may serve a particular implementation.

User interface facility 302 may be configured to provide an interface through which a user may interact with testing subsystem 104. For example, a user such as a tester (e.g., quality assurance personnel) or a technical support representative may provide user input to testing subsystem 104 through a user interface provided by user interface facility 302 to direct testing subsystem 104 to perform one or more of the testing operations described herein. In certain examples, user interface facility 302 may provide a user interface through which a user may interact with a GUI provided by GUI code. An example of a user interface that may be provided by user interface facility 302 is described in detail below.

Code interface facility 304 may be configured to provide an interface through which testing subsystem 104 may interact with GUI code such as GUI code 200. Through the interface, testing subsystem 104 may provide one or more messages to the GUI code and/or may access data exposed by the GUI code (e.g., data representative of type identifiers and/or a log of events exposed by the GUI code). Code interface facility 304 may employ any suitable technologies to provide an interface to support interaction with the GUI code.

Playback facility 306 may be configured to leverage a log of events provided by the GUI code to facilitate a playback of one or more of the events specified in the log of events. To facilitate the playback of the one or more events, playback facility 306 may interact with the GUI code or with a copy of the GUI code that provided the log of events to provide one or more messages configured to cause the GUI code to perform the one or more events specified in the log of events. To illustrate, where an event in the log of events includes a selection of a button included in the GUI provided by the GUI code, playback facility 306 may provide a message to the GUI code. The message may be configured to simulate an actual user selection of the button and to cause the GUI code to detect a selection of the button. The GUI code may perform one or more functions in response to the message simulating the selection of the button. Playback facility 306 may provide one or more additional messages to the GUI code to simulate one or more other events included in the log of events such that the GUI code is caused to reproduce one or more of the events specified in the log of events.

In certain implementations, playback facility 306 may be configured to provide messages to the GUI code for only a select set of events included in a log of events. For example, playback facility 306 may be configured to identify, based on type identifier data included in the log of events, a set of events that includes only external interactions with actionable graphical elements in the GUI, or with a particular type of actionable graphical elements in the GUI (e.g., selections of selectable buttons in the GUI). Playback facility 306 may then provide only messages simulating the select set of events (e.g., user interactions) to the GUI code to simulate actual user input to cause the GUI code to respond to messages from playback facility 306 in the same way that the GUI code responds to actual user interactions with the GUI.

Playback facility 306 may be configured to allow a user of testing subsystem 104 to provide user-configurable settings configured to govern the playback of one or more events specified in a log of events. For example, playback facility 306 may allow a user to provide input to set a speed and/or a delay to be used in the playback. For instance, the user may instruct playback facility 306 to perform a playback in real time, as fast as computer resources allow (e.g., without any built-in delays), or with a set delay (e.g., a set amount of time) between events. As another example, playback facility 306 may allow a user to provide input to indicate a start and/or a stop point for playback. For instance, the user may instruct playback facility 306 to start a playback after a certain number of a certain type of events have occurred in the log of events (e.g., after a third "screen draw" event). As another example, playback facility 306 may allow a user to provide input to indicate one or more types of logged events that will be selectively played back or ignored during playback. As another example, playback facility 306 may allow a user to provide input to indicate certain playback operations to be performed for certain types of logged events. For instance, a user may provide input indicating that a playback should include waiting or not invoking a playback for a particular type of event (e.g., a type of event not directly invoked by a user, such as a screen draw type event).

Testing facility 308 may be configured to perform one or more operations to test GUI code. In certain implementations, testing facility 308 may be configured to perform one or more test operations in conjunction with a playback of events by playback facility 306. For example, testing facility 308 may be configured to access and use type identifier data included in a log of events to identify specific types of events specified in the log of events and to identify and perform specific testing operations for those events. Testing facility 308 may use the type identifier data in the log of events to determine appropriate test operations to perform in conjunction with playback of the events. To illustrate, a log of events may include data representative of a "screen draw" event representative of a GUI function performed by the GUI code to render a GUI screen. In response to detecting a "screen draw" event in the log of events, at an appropriate time during the playback of one or more events specified in the log of events, testing facility 308 may automatically perform a screen capture operation to capture an image of the GUI screen being provided by GUI code for display and to use the captured screenshot to determine whether the correct GUI screen is rendered at the appropriate time during the playback of the one or more events. This example is illustrative only. Additional or alternative testing operations may be performed by testing facility 308 in response to a detection of additional or alternative types of events specified in a log of events. For example, testing operations may include, but are not limited to, checking for memory leaks, checking for proper garbage data collection, checking variable data values, and checking dismissals of GUI screens in response to testing facility 308 and/or playback facility 306 detecting certain types of events specified in a log of events. In certain implementations, testing facility 308 may allow a user to provide input to indicate one or more testing operations that will be performed for certain types of logged events.

Accordingly, playback facility 306 may interact with GUI code to cause the GUI code to reproduce a set of recorded events, and testing facility 308 may perform one or more tests of the GUI provided by the GUI code in association with the playback. The playback may be repeated any number of times, and testing facility 308 may be configured to perform a different set of test operations and/or type of test operations in association with each playback to support comprehensive testing of the GUI. Because the log of events includes type identifier data (e.g., type identifiers specifying types of events such as types of interactions, types of graphical elements interacted with, and/or types of GUI functions performed), testing subsystem 308 may leverage the type identifier data to perform specific, targeted test operations to test the GUI.

In addition or alternative to performing one or more test operations in conjunction with a playback of events, testing facility 308 may be configured to perform direct testing of a GUI provided by GUI code by directly interacting with the GUI code to cause the GUI code to perform one or more functions (e.g., one or more GUI functions 206). The direct testing of the GUI code may be performed without leveraging a log of recorded events provided by the GUI code. In certain examples, the direct testing may cause the GUI code to generate and provide a log of recorded events representative of GUI operations performed during the direct testing of the GUI code by testing facility 308.

Testing facility 308 may be configured leverage data exposed by the GUI code to directly test the GUI code. For example, testing facility 308 may be configured to query the GUI code to identify all graphical elements of a particular type (e.g., actionable, button, text field, or any other type of graphical elements) included in the GUI provided by the GUI code. GUI code may respond by providing data representative of the graphical elements of the queried type included in the GUI to testing subsystem 104. Testing facility 308 may utilize the data returned by the GUI code to conduct one or more testing operations to test the GUI code. For example, based on the data representative of the graphical elements of the queried type, testing facility 308 may generate and provide one or more messages configured to simulate one or more interactions with one or more of the identified graphical elements of the queried type. The GUI code may detect the messages and respond by performing one or more functions, as described above. Testing facility 308 may perform any suitable testing operations in conjunction with the direct testing to determine whether the GUI code is functioning as expected.

In certain implementations, testing facility 308 may be configured to randomly select one or more of the identified graphical elements of the queried type for testing. In other implementations, testing facility 308 may be configured to systematically select each of the identified graphical elements of the queried type for testing. In either implementation, testing facility 308 may be configured to provide one or more messages configured to cause the GUI code to perform one or more GUI functions.

To illustrate, while the GUI code is executing on a computing device, a particular GUI screen may be displayed. Testing facility 308 may interact with the GUI code to query and discover all of the button type graphical elements included in the GUI screen being displayed. Testing facility 308 may then provide one or more messages to the GUI code to randomly or systematically test one or more of the button type graphical elements. For example, testing facility 308 may provide a message configured to simulate a user selection of a particular button included in the GUI screen being displayed. The GUI code may respond to the message by performing one or more functions, as described above. Testing facility 308 may repeat one or more of these operations to continue to test GUI functionality related to interactions with one or more graphical elements in the GUI. For instance, the simulated selection of the button may cause the GUI code to navigate to and render a different GUI screen. With the different GUI screen displayed, testing facility 308 may again query and discover all of the selectable buttons included in the different GUI screen, and provide one or more messages configured to simulate a selection of one or more of the buttons included in the different GUI screen.

In certain embodiments, testing facility 308 may be configured to query the status of each identified graphical element of the queried type. Accordingly, testing facility 308 may determine whether graphical elements are enabled to be interacted with and to provide one or more GUI functions in response to the interaction or disabled from being interacted with and providing one or more GUI functions in response to the interaction. Such status data may be used by testing facility 308 to message only enabled graphical elements for purposes of testing and/or to attempt to message disabled graphical elements to verify that the disable graphical elements are actually disabled.

In this or a similar manner, testing facility 308 may leverage data exposed by the GUI code (e.g., graphical element type identifiers and/or statuses) to interact directly with the GUI code to test specific types of graphical elements and/or one or more GUI functions associated with the specific types of graphical elements included in the GUI. Testing framework functions included in the GUI code may be performed during the direct testing to create a log of events related to the direct testing. Playback facility 306 may facilitate a playback of one or more of the events specified in the log of events representative of the direct testing, as described above, and testing facility 308 may perform one or more test operations in conjunction with the playback, as described above.

Storage facility 310 may be configured to maintain GUI code data 312 representative of GUI code (e.g., GUI code 200 or a copy of GUI code 200) and log data 314 representative of one or more logs of GUI events. Storage facility 310 may be configured to maintain additional and/or alternative data as may suit a particular implementation.

Figure 4:
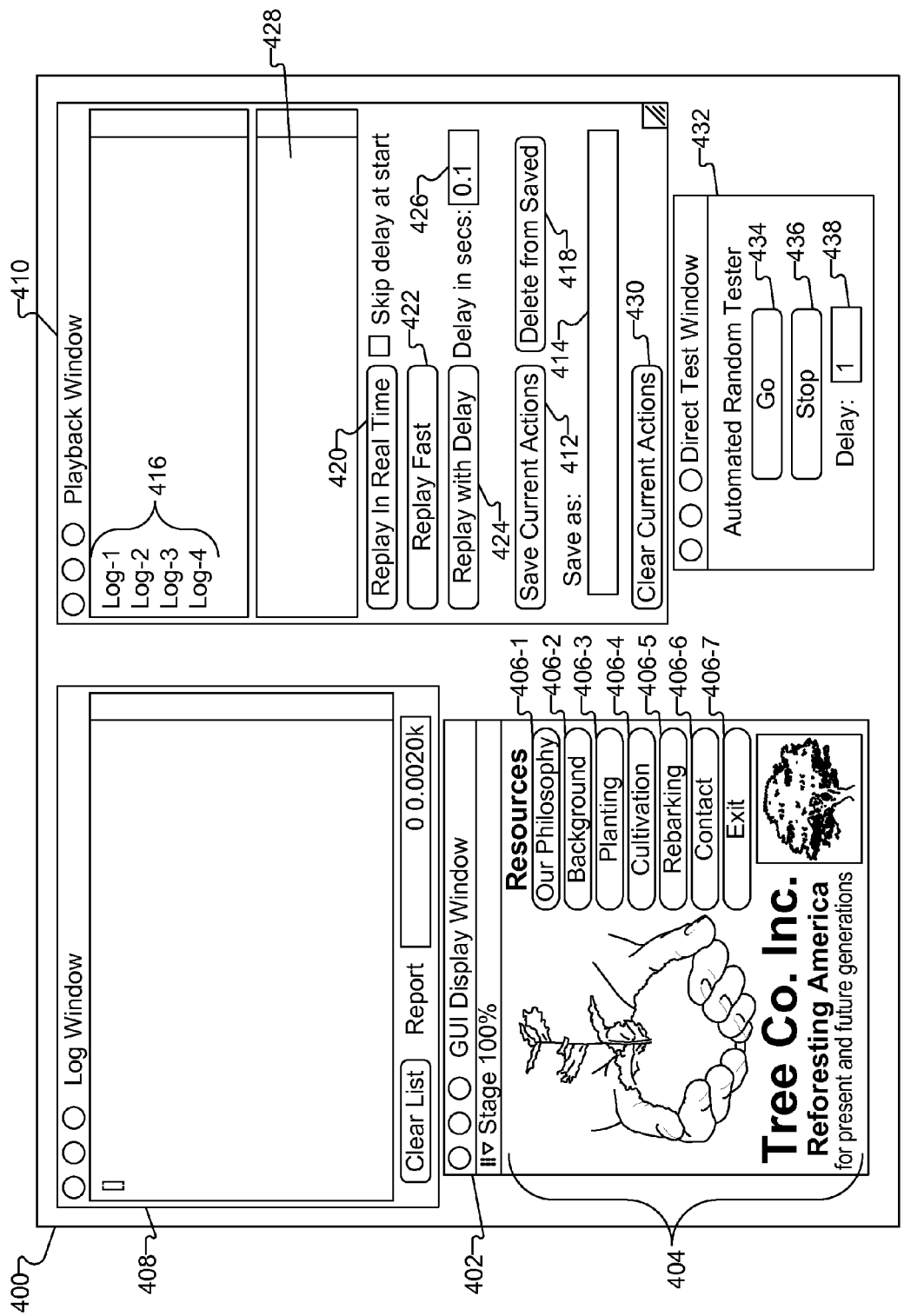
FIG. 4 illustrates an exemplary testing user interface according to principles described herein.

To further facilitate an understanding of the exemplary systems and methods described herein, an exemplary testing user interface and exemplary operations that may be performed by GUI code (e.g., GUI code 200) and/or testing subsystem 104 will now be described. FIG. 4 illustrates an exemplary testing user interface 400 (or simply "user interface 400") that may be provided by user interface facility 302 of testing subsystem 104 for display. Through user interface 400, a user may interact with a GUI provided by GUI code executing on a computing device, access data exposed by the GUI code providing the GUI, initiate and/or control a playback of events associated with the GUI, initiate direct testing of the GUI, and/or initiate one or more other testing operations to test the GUI.

As shown in FIG. 4, user interface 400 may include a GUI display window 402, which may display a GUI screen included in a GUI provided by GUI code executing on a computing device. In the example shown in FIG. 4, GUI display window 402 displays a GUI screen 404 that includes graphical elements displayed therein. The content displayed in GUI display window 402 may be dynamically updated by the GUI code in accordance with the functionality of the GUI. For example, GUI screen 404 may be dismissed and a different GUI screen rendered in GUI display window 402 in accordance with the functionality of the GUI, such as in response to user input that triggers navigation from GUI screen 404 to a different GUI screen.

As shown in FIG. 4, GUI screen 404 may include a plurality of actionable graphical elements in the form of user selectable buttons 406. In the illustrated example, buttons 406 include buttons 406-1 through 406-7 labeled "Our Philosophy," "Background," "Planting," "Cultivation," "Rebarking," "Contact," and "Exit," respectively. Through user interface 400, a user may interact with GUI screen 404 such as by selecting any of selectable buttons 406 displayed in GUI display window 402.

The GUI code providing the GUI in GUI display window 402 may be configured to generate and provide a log of events associated with the GUI, as described above. Data representative of the log of events may be displayed in user interface 400. For example, as shown in FIG. 4, user interface 400 may include a log window 408, which may be configured to display data representative of the log of events. In certain examples, the data displayed in log window 408 may be dynamically updated as data representative of one or more events is added to the log of events.

Figure 5:
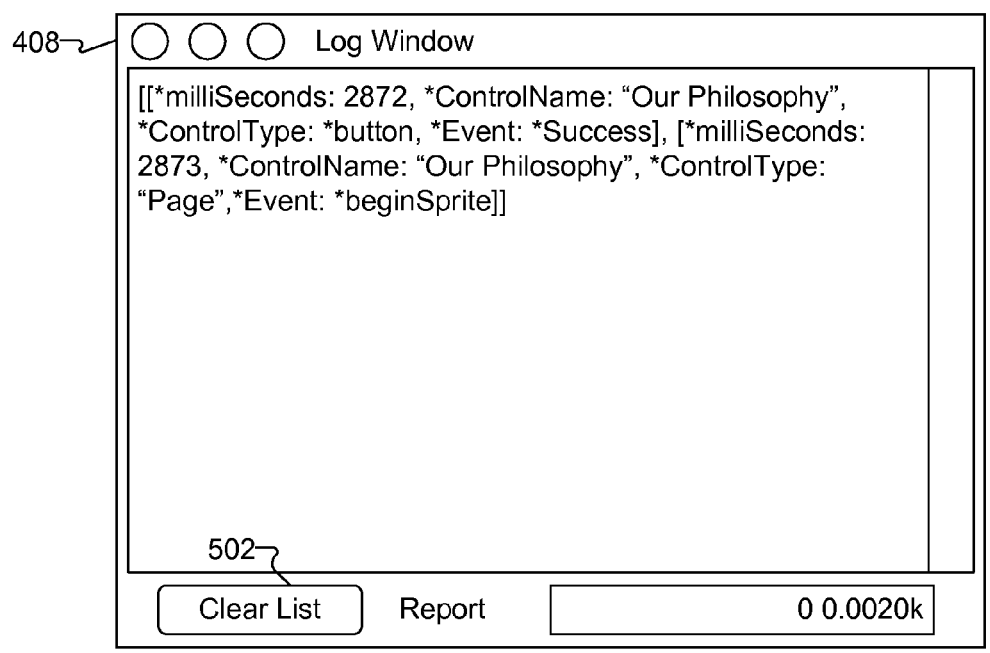
FIG. 5 illustrates an exemplary log of events displayed in a log window of the testing user interface of FIG. 4 according to principles described herein.

To illustrate, a user may provide input to select the "Our Philosophy" button 406-1 in GUI display window 402. In response, the GUI code providing the GUI in GUI display window 402 may generate and add one or more entries to a log of events, and the data displayed in log window 408 may be updated accordingly. For example, FIG. 5 illustrates log window 408 displaying a log of events associated with the user selection of the "Our Philosophy" button 406-1. In the illustrated example, the log of events includes two entries—a first entry representative of the detected user selection of the "Our Philosophy" button 406-1 (the first entry comprises "[*milliSeconds: 2872, *ControlName: "Our Philosophy", *ControlType: *button, *Event: *Success]" in FIG. 5) and a second entry corresponding to a performance of a "screen draw" function to render a GUI screen named "Our Philosophy" (the second entry comprises "[*milliSeconds: 2873, *ControlName: "Our Philosophy", *ControlType: "Page",*Event: *beginSprite]" in FIG. 5). As shown, the first entry may include data indicating an elapsed time (e.g., in milliseconds) from the launch of the GUI in GUI display window 402 up until a time at which the corresponding event (e.g., a user selection of the "Our Philosophy" button 406-1) is detected, a control name for a graphical element associated with the event (e.g., the name of a selected button), a control type indicating a type of the graphical element associated with the event (e.g., a "button" type graphical element), and an event indictor indicating the event associated with the first entry (e.g., a "success" indicating a user selection of the button 406-1). Similarly, the second entry may include data indicating an elapsed time (e.g., in milliseconds) from the launch of the GUI in GUI display window 402 up until a time at which the corresponding event (e.g., a rendering of a GUI screen) is performed, a control name for a graphical element associated with the event (e.g., the name of a rendered GUI screen), a control type indicating a type of the graphical element associated with the event (e.g., a "page" or GUI screen type graphical element), and an event indictor indicating the event associated with the first entry (e.g., a "beginSprite" event indicating a "screen draw" of the GUI screen names "Our Philosophy").

The GUI events displayed in log window 408 may be cleared in response to a user selecting a button 502 labeled "Clear List" in FIG. 5.

As shown in FIG. 5, entries in the log of events generated and provided by the GUI code may expose certain data associated with the GUI, including elapsed times, graphical element identifiers, identifier types, and types of events associated with the GUI. Any of the data included in the log of events may be accessed and used by testing subsystem 104 for testing the GUI, as described herein.

Accordingly, a user of user interface 400 may interact with the GUI provided in GUI display window 402 to cause the GUI code providing the GUI to generate and provide a log of events representative of a session of interactions with the GUI. The log of events may be used for testing the GUI. For example, referring again to FIG. 4, the user interface 400 may include a playback window 410. Through the content of playback window 410, a user may control playback of GUI events recorded in a log of events.

To illustrate, playback window 410 may include a selectable button 412 labeled "Save Current Actions" in FIG. 4. A user may select button 412 to cause a current log of events displayed in log window 408 to be saved (e.g., to a computer-readable medium) such that the saved log of events is available for access and playback. The user may specify a name for the log of events in a text entry field 414 labeled "Save as:" in FIG. 4.

Playback window 410 may also include a list 416 of saved logs of GUI events. In the illustrated example, playback window 410 displays a list 416 containing names of four saved logs of events. A user may select from list 416 a particular log of events for processing, including deleting the selected log of events from list 416 by selecting a "Delete from Saved" button 418 or initiating a playback of one or more events specified in the selected log of events using other controls in playback window 410. For example, the user may provide input to initiate a playback of the selected log of events in real time by selecting a "Replay in Real Time" button 420, in a "fast mode" (e.g., without any injected delays) by selecting a "Replay Fast" button 422, or with an injected delay by selecting a "Replay with Delay" button 424 when a user-specified delay amount is entered in text entry field 426 labeled "Delay in secs:."

The controls displayed within playback window 410 in FIG. 4 are illustrative only. Additional or alternative controls configured to allow a user to control a playback of a log of events may be included in playback window 410 in other embodiments. For example, playback window 410 may include one or more controls configured to allow a user to specify starting and/or ending conditions that may be used to start and/or end a playback of events at particular starting and/or ending points. For instance, a user may provide input indicating that a playback is to be started after a particular event or an event of a particular type is specified in a log of events, or that a playback is to end in response to a particular event and/or type of event specified in a log of events.

When a playback is performed, a list of events performed as part of the playback may be displayed in area 428 of playback window 410. Accordingly, a user may visually check whether events are played back as expected. In addition, the playback of the events may cause the GUI code to generate and provide a log of events associated with the playback. This log of events may be displayed in area 428 and may be processed as any other log of events, as described herein. The user may clear the listed events from area 428 by selecting a button 430 labeled "Clear Current Actions" within playback window 410.

As mentioned above, testing subsystem 104 may be configured to perform any suitable testing operations, including any of the exemplary testing operations mentioned herein, in conjunction with a playback of GUI events specified in a log of events to test a GUI. Any information associated with the performance and/or results of such testing operations may be presented in user interface 400 and/or in any other suitable manner.

In addition or alternative to facilitating access to and leveraging of data included in a log of recorded GUI events to test a GUI as described herein, user interface 400 may be configured to facilitate direct testing of the GUI. As shown in FIG. 4, for example, user interface 400 may include a direct test window 432, which may include one or more controls with which a user may interact to control direct testing of the GUI. To illustrate, direct test window 432 may include selectable buttons 434 and 436 that may be selected by a user to respectively initiate and terminate direct testing of the GUI. Direct test window 438 may also include a text entry field 438 in which a user may specify a delay to be used in direct testing of the GUI.

In response to a user selection of button 434, testing subsystem 104 may initiate direct testing of the GUI, which testing may be performed in any of the ways described herein. For example, testing subsystem 104 may query the GUI code providing the GUI for select data and use the data returned by the GUI code to randomly or systematically select, generate, and send messages to the GUI code to cause the GUI code to perform one or more GUI functions. As mentioned, the GUI code may generate and provide a log of events descriptive of the direct testing of the GUI such that the log of events may be leveraged for additional testing of the GUI.

Figure 6:
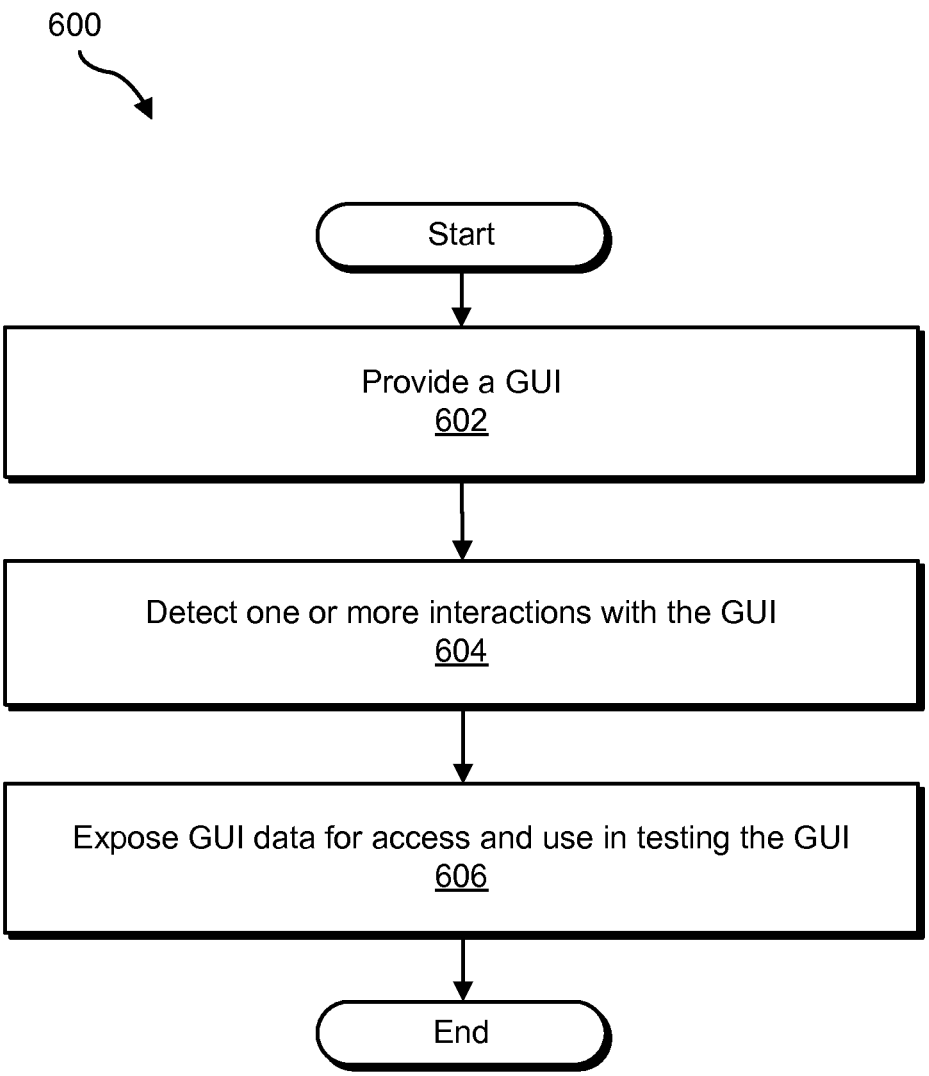
FIGS. 6-8 illustrate exemplary graphical user interface testing methods according to principles described herein.
Figure 7:
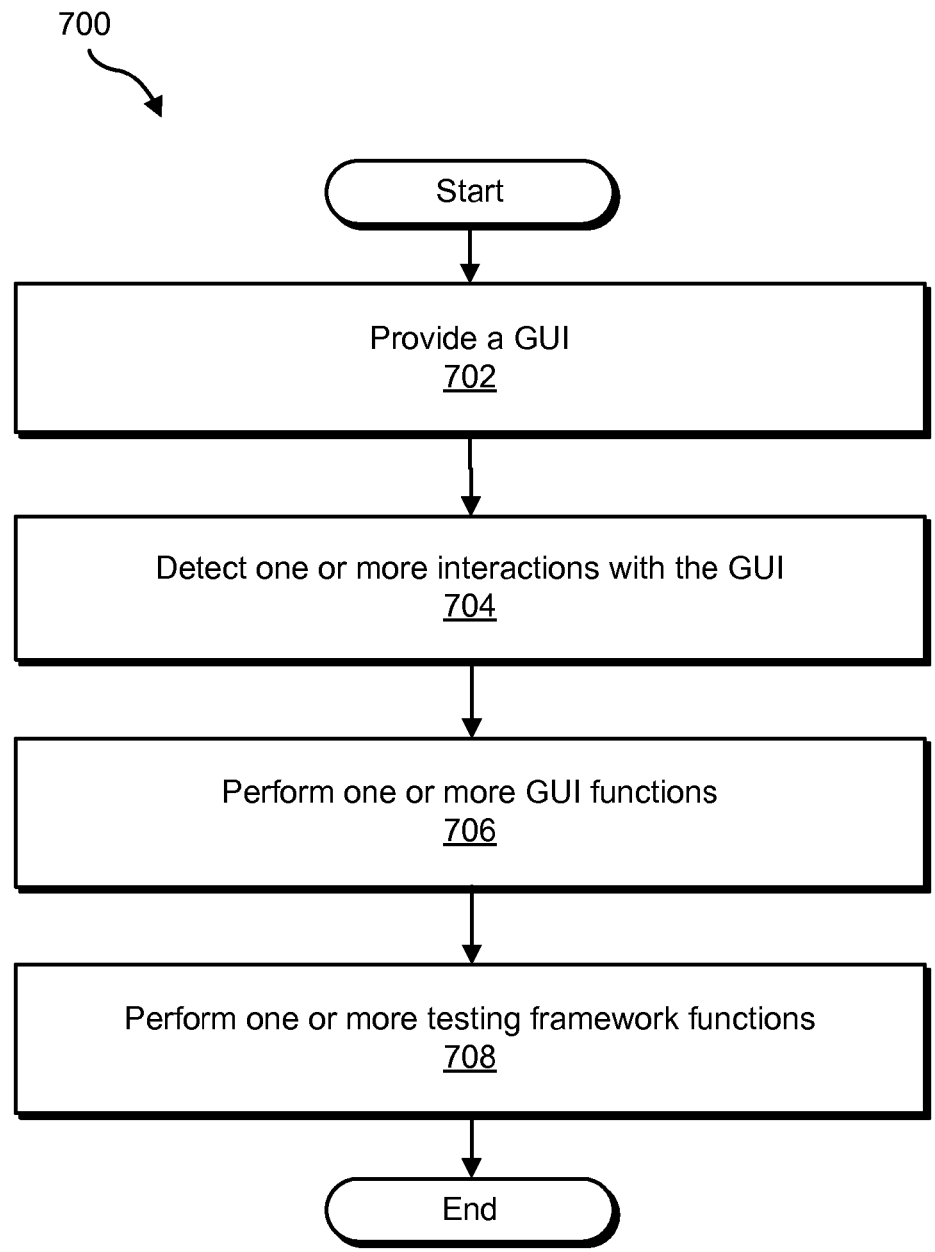
Figure 8:
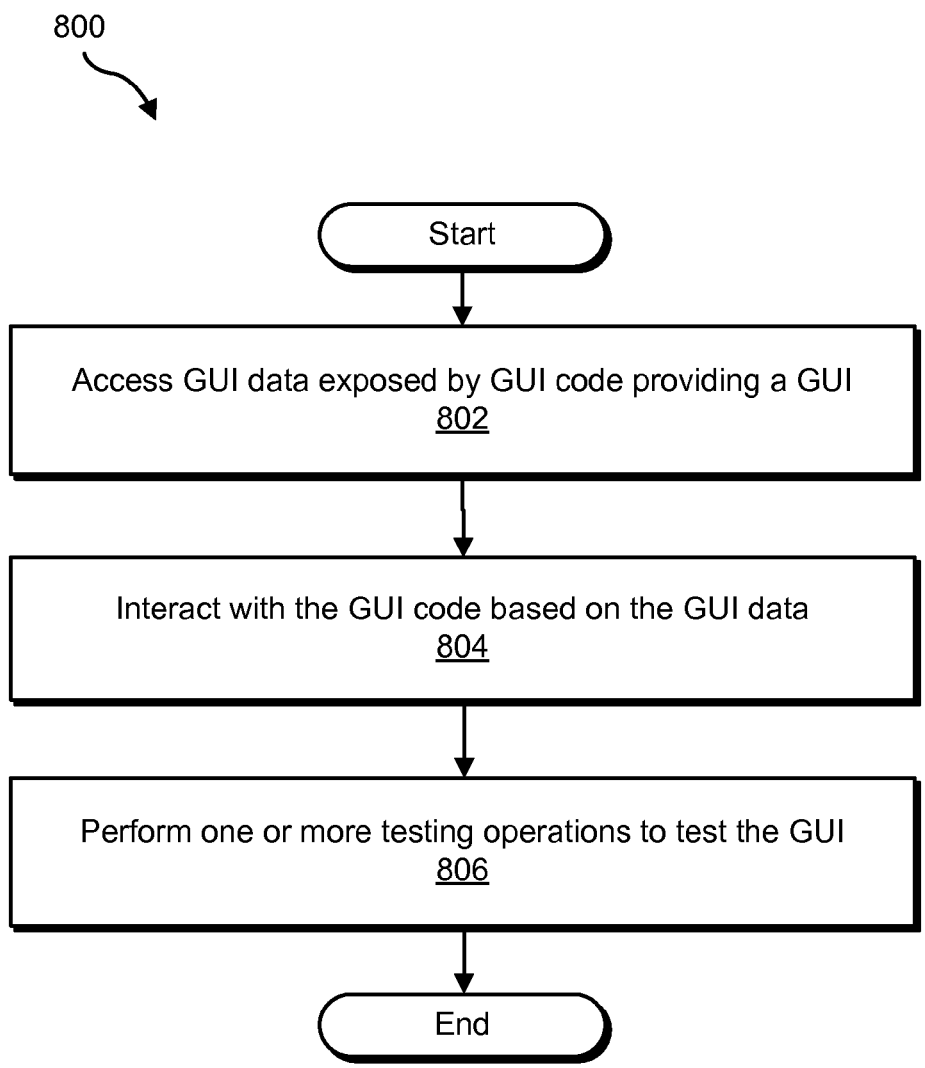

FIGS. 6-8 illustrate exemplary GUI testing methods 600-800. While FIGS. 6-8 illustrate exemplary steps according to certain embodiments, other embodiments may omit, add to, reorder, combine, and/or modify any of the steps shown in FIGS. 6-8. The steps shown in FIGS. 6-7 may be performed by GUI subsystem 102, GUI code (e.g., GUI code 200) executing on a computing device, or any components thereof. The steps shown in FIG. 8 may be performed by testing subsystem 104 or any components thereof.

Referring now to method 600 in FIG. 6, in step 602, a GUI may be provided. For example, GUI code executing on a computing device may provide the GUI, such as described herein.

In step 604, one or more interactions with the GUI may be detected. For example, the GUI code executing on the computing device to provide the GUI may detect one or more interactions with the GUI. As described herein, in some examples, the interactions with the GUI may include external interactions provided by one or more sources external to the GUI code. Examples of such external interactions may include, without limitation, one or more queries of the GUI code provided by testing subsystem 104, one or more user interactions with the GUI, and one or more messages provided by testing subsystem 104 and configured to cause the GUI code to perform one or more GUI functions, such as described herein.

In step 606, GUI data associated with the GUI may be exposed for access and use in testing the GUI. For example, the GUI code executing on the computing device to provide the GUI may expose the GUI data associated with the GUI for access and use by testing subsystem 104 to test the GUI, such as described above. Examples of the GUI code exposing GUI data for use in testing the GUI may include, without limitation, identifying and providing query results to testing subsystem 104 and/or providing a log of events generated by the GUI code based on the interactions detected in step 604 and GUI functions performed by the GUI code in response to the interactions. Hence, the GUI data exposed in step 606 may include any of the exemplary data described herein, including, without limitation, graphical element identifiers, graphical element type identifiers, graphical element status identifiers, GUI function identifiers, and GUI function type identifiers.

A particular example of GUI code exposing GUI data for use in testing a GUI will now be described in connection with method 700 shown in FIG. 7.

In step 702, a GUI may be provided, such as described herein.

In step 704, one or more interactions with the GUI may be detected, such as described herein.

In step 706, one or more GUI functions may be performed. For example, GUI code executing on a computing device to provide the GUI may perform one or more GUI functions in response to the one or more interactions detected in step 704.

In step 708, one or more testing framework functions may be performed. For example, the GUI code executing on the computing device to provide the GUI may perform one or more testing framework functions, including any of those described herein, in response to the one or more interactions detected in step 704.

In certain implementations, the one or more testing framework functions performed in step 708 may include recording data representative of GUI events associated with the interactions with GUI detected in step 704 and/or the performance of one or more GUI functions in step 706. The GUI events may be recorded to a log of events, which may be exposed by the GUI code for access and use by testing subsystem 104 to test the GUI. For example, testing subsystem 104 may initiate a playback of one or more events specified in the log of events for use in testing the GUI, such as described herein.

In association with one or more of the steps of methods 600 and 700, testing subsystem 104 may perform one or more operations to access exposed GUI data, interact with GUI code, and perform one or more testing operations to test a GUI. For example, FIG. 8 illustrates an exemplary GUI testing method 800 that may be performed by testing subsystem 104.

In step 802, GUI data exposed by GUI code executing on a computing device to provide a GUI may be accessed by testing subsystem 104. Testing subsystem 104 may access the exposed GUI data in any of the ways described herein. For example, testing subsystem 104 may provide a query for specific GUI data to the GUI code and may receive the requested GUI data (e.g., a list of all actionable and enabled graphical elements included in a displayed screen of the GUI) from the GUI code. As another example, testing subsystem 104 may access the GUI data included in a log of events generated and provided by the GUI code.

In step 804, testing subsystem 104 may interact with the GUI code based on the GUI data access in step 802. Testing subsystem 104 may interact with the GUI code in any of the ways described herein. For example, testing subsystem 104 may provide one or more messages to the GUI code to cause the GUI code perform one or more GUI functions. The messages provided to the GUI code may be selected by testing subsystem 104 based on the GUI data accessed in step 802. The messages provided by testing subsystem 104 to the GUI code may be provided as part of direct testing of the GUI as part of a process to cause the GUI code to play back one or more events included in a log of events accessed by testing subsystem 104, such as described herein.

In step 806, testing subsystem 104 may perform one or more testing operations to test the GUI. Testing subsystem 104 may select specific testing operations to be performed in step 806 based at least in part on the GUI data accessed in step 802. For example, a specific testing operation may be selected and performed each time a particular type of event and/or particular graphical element is specified in a log of events.

The exemplary GUI testing systems and methods described herein may be useful for testing a GUI in a variety of testing environments and/or for a variety of purposes. For example, the exemplary systems and methods described herein may be useful to quality assurance personnel tasked with testing a GUI for quality assurance purposes. As another example, the systems and methods described herein may be useful to a technical support representative tasked with helping customers to troubleshoot or otherwise test a GUI. To illustrate, an end user of a computing device (e.g., a set-top-box device, a DVR device, a mobile device (e.g., a mobile phone), a gaming console, or other computing device) executing deployed GUI code to provide a GUI with which the user may interact may seek assistance from a technical support representative. Once contacted, the technical support representative may be able to use the exemplary systems and methods described herein to access a log of events associated with the GUI and generated by the GUI code executing on the end user's computing device. Through user interface 400, the technical support representative may initiate a playback of one or more events specified in the log of events. As described above, testing subsystem 104 may perform one or more testing operations in conjunction with the playback of the one or more events, which may assist the technical support representative in re-creating the end user's interactions with the GUI and identifying any potential problems with the GUI code executing on the end user's computing device.

GUI code configured to provide a testing framework as described herein may be generated in any suitable way, including through manual, automatic, or a combination of manual and automatic code development processes. In certain implementations, GUI code configured to provide a testing framework as described herein may be at least partially generated in accordance with the teachings of co-pending U.S. patent application Ser. No. 12/983,109, entitled AUTOMATED GRAPHICAL USER INTERFACE DESIGN AND DEVELOPMENT SYSTEMS AND METHODS, and filed concurrently herewith, the contents of which are hereby incorporated by reference. As described therein, in certain automated graphical user interface design and development systems and methods, a graphical element identifier may coincide with a layer name in a design tool and may include in-line commands that may specify, among other things, a type for the graphical element. An automated graphics exporter may automatically generate and output computing code that includes the type identifiers integrated therein (e.g., within file names for the graphical elements).

In certain embodiments, one or more of the components and/or processes described herein may be implemented and/or performed by one or more appropriately configured computing devices. To this end, one or more of the systems and/or components described above may include or be implemented by any computer hardware and/or computer-implemented instructions (e.g., software) embodied in a non-transitory computer-readable medium, or combinations of computer-implemented instructions and hardware, configured to perform one or more of the processes described herein. In particular, system components may be implemented on one physical computing device or may be implemented on more than one physical computing device. Accordingly, system components may include any number of computing devices, and may employ any of a number of computer operating systems.

GUI code and/or one or more of the processes described herein may be implemented at least in part as instructions executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other medium from which a computer can read.

Figure 9:
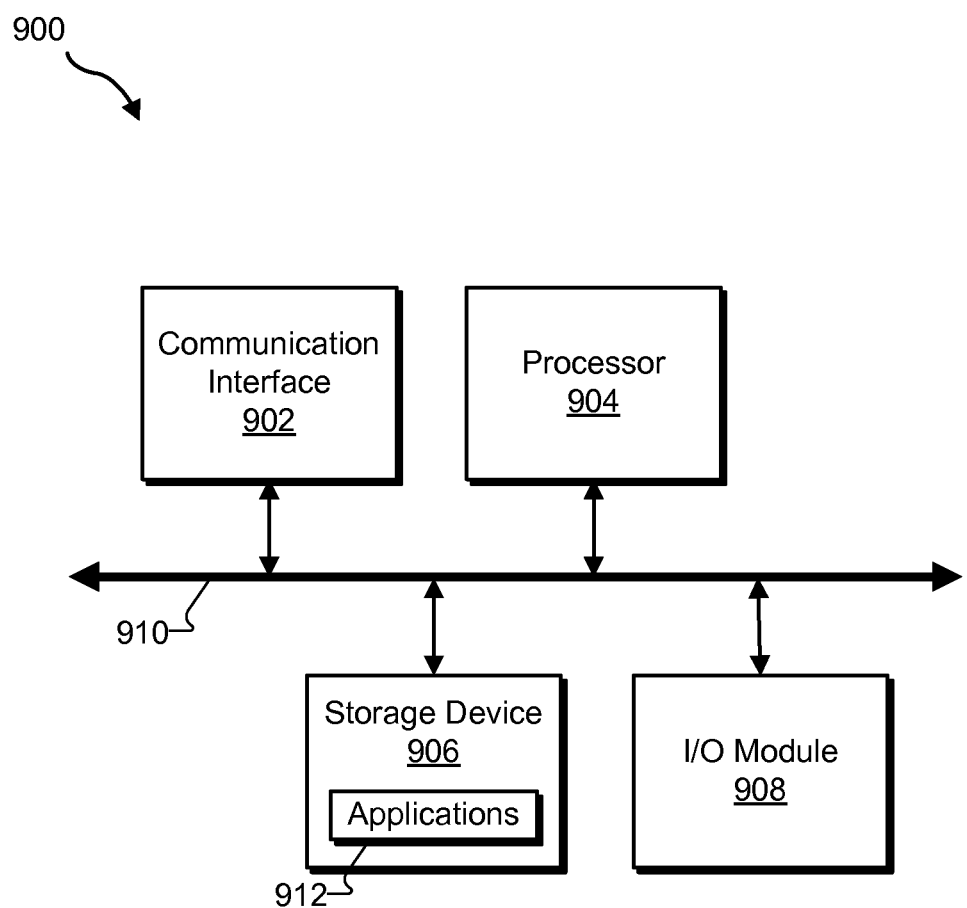
FIG. 9 illustrates an exemplary computing device according to principles described herein.

FIG. 9 illustrates an exemplary computing device 900 configured to perform one or more of the processes described herein. In certain embodiments, computing device 900 may implement GUI subsystem 102 and/or testing subsystem 104 of system 100, and/or may execute GUI code such as GUI code 200 to provide a GUI. As shown in FIG. 9, computing device 900 may include a communication interface 902, a processor 904, a storage device 906, and an input/output ("I/O") module 908 communicatively connected via a communication infrastructure 910. While an exemplary computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, and any other suitable interface. Communication interface 902 may additionally or alternatively provide such a connection through, for example, a local area network (such as an Ethernet network), a personal area network, a telephone or cable network, a satellite data connection, a dedicated URL, or any other suitable connection. Communication interface 902 may be configured to interface with any suitable communication media, protocols, and formats, including any of those mentioned above.

Processor 904 generally represents any type or form of processing unit capable of processing data or interpreting, executing, and/or directing execution of one or more of the instructions, processes, and/or operations described herein. Processor 904 may direct execution of operations in accordance with one or more applications 912 or other computer-executable instructions such as may be stored in storage device 906 or another computer-readable medium.

Storage device 906 may include one or more data storage media, devices, or configurations and may employ any type, form, and combination of data storage media and/or device. For example, storage device 906 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 906. For example, data representative of one or more executable applications 912 configured to direct processor 904 to perform any of the operations described herein may be stored within storage device 906. In some examples, data may be arranged in one or more databases residing within storage device 906.

I/O module 908 may be configured to receive user input and provide user output and may include any hardware, firmware, software, or combination thereof supportive of input and output capabilities. For example, I/O module 908 may include hardware and/or software for capturing user input, including, but not limited to, a keyboard or keypad, a touch screen component (e.g., touch screen display), a receiver (e.g., an RF or infrared receiver), and/or one or more input buttons.

I/O module 908 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 908 is configured to provide graphical data to a display for presentation to a user. The graphical data may be representative of one or more GUIs and/or any other graphical content as may serve a particular implementation.

In certain implementations, one or more components of system 100 may be implemented by computing device 900. For example, applications 912 may be configured to direct processor 904 to perform one or more operations of GUI code 200, user interface facility 302, code interface facility 304, playback facility 306, and/or testing facility 308. Additionally or alternatively, storage facility 310 may be implemented on storage device 906.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
providing, by graphical user interface code executing on a computing device, a graphical user interface including one or more graphical elements;
exposing, by the graphical user interface code executing on the computing device, data representative of one or more graphical element type identifiers indicating one or more types of the one or more graphical elements for access and use by a testing subsystem to test the graphical user interface, wherein the exposing comprises:
generating a log of events associated with the graphical user interface, the log of events including the data representative of the one or more graphical element type identifiers indicating the one or more types of the one or more graphical elements, and
providing data representative of the log of events for access by the testing subsystem;
detecting, by the graphical user interface code executing on the computing device, one or more interactions with the graphical user interface, wherein the log of events specifies the detected one or more interactions with the graphical user interface;
accessing, by the testing subsystem, data representative of the log of events;
determining, by the testing subsystem from the log of events, the detected one or more interactions with the graphical user interface; and
providing, by the testing subsystem to either the graphical user interface code executing on the computing device or a copy of the graphical user interface code executing on another computing device, one or more messages configured to cause the graphical user interface code to play back the detected one or more interactions with the graphical user interface.

2. The method of claim 1, wherein:
the detected one or more interactions with the graphical user interface comprise one or more interactions with the one or more graphical elements included in the graphical user interface; and
the one or more graphical element type identifiers included in the log of events indicate the one or more types of the one or more graphical elements interacted with by the one or more interactions with the one or more graphical elements.

3. The method of claim 1, further comprising:
performing, by the graphical user interface code executing on the computing device, one or more graphical user interface functions in response to the one or more detected interactions with the graphical user interface;
wherein the log of events includes data representative of one or more graphical user interface function type identifiers indicating one or more types of the one or more graphical user interface functions.

4. The method of claim 1, wherein the one or more interactions with the graphical user interface comprise one or more user interactions with the one or more graphical elements included in the graphical user interface.

5. The method of claim 1, wherein the one or more interactions with the graphical user interface comprise one or more messages received from the testing subsystem by the graphical user interface code executing on the computing device.

6. The method of claim 5, wherein the one or more messages received from the testing subsystem are configured to simulate one or more actual user interactions with the graphical user interface.

7. The method of claim 6, wherein the one or more messages configured to simulate the one or more actual user interactions with the graphical user interface are randomly or systematically selected by the testing subsystem based on the one or more graphical element type identifiers indicating the one or more types of the one or more graphical elements included in the graphical user interface.

8. The method of claim 1, further comprising performing, by the graphical user interface code executing on the computing device, one or more graphical user interface functions in response to the one or more messages to play back one or more of the events specified in the log of event.

9. The method of claim 8, further comprising:

selecting, by the testing subsystem, one or more testing operations based on at least one of the one or more graphical element type identifiers and the one or more graphical user interface function type identifiers included in the log of events; and performing, by the testing subsystem, the one or more testing operations in conjunction with the playback to test the graphical user interface.

10. The method of claim 1, further comprising:

receiving, by the graphical user interface code executing on the computing device from the testing subsystem, a query for data representative of all actionable type graphical elements included in the one or more graphical elements;

using, by the graphical user interface code executing on the computing device, the one or more graphical element type identifiers to identify all actionable type graphical elements included in the one or more graphical elements; and exposing, by the graphical user interface code executing on the computing device, data representative of the identified actionable type graphical elements included in the one or more graphical elements to the testing subsystem in response to the query.

11. The method of claim 10, further comprising:

selecting, by the testing subsystem, one or more messages based on the identified actionable type graphical elements exposed by the graphical user interface code executing on the computing device;

providing, by the testing subsystem, the one or more messages to the graphical user interface code executing on the computing device to cause the graphical user interface code executing on the computing device to perform one or more graphical user interface functions; and performing, by the testing subsystem, one or more testing operations in conjunction with the providing of the one or more messages to the graphical user interface code executing on the computing device.

12. The method of claim 1, embodied as computer-executable instructions on at least one non-transitory computer-readable medium.

13. A method comprising:

providing, by graphical user interface code executing on a computing device, a graphical user interface including one or more actionable graphical elements;

detecting, by the graphical user interface code executing on the computing device, each external interaction with the one or more actionable graphical elements included in the graphical user interface;

performing, by the graphical user interface code executing on the computing device, one or more graphical user interface functions in response to each detected external interaction with the one or more actionable graphical elements included in the graphical user interface;

performing, by the graphical user interface code executing on the computing device, one or more testing framework functions in response to each detected external interaction with the one or more actionable graphical elements included in the graphical user interface, the one or more testing framework functions providing a testing framework configured to be leveraged for testing the graphical user interface code, wherein the one or more testing framework functions comprise a log event function configured to record, in a log of events, one or more events associated with each detected external interaction with the one or more actionable graphical elements included in the graphical user interface, and wherein each entry in the log of events is associated with an event within the one or more events and comprises data representative of a time associated with the event, a unique identifier for the graphical element associated with the event, a type identifier indicative of a type of the graphical element associated with the event, and an identifier for the event; and accessing and using, by a testing subsystem configured to interface with the graphical user interface code executing on the computing device, the log of events to initiate a playback of each detected external interaction with the one or more actionable graphical elements included in the graphical user interface.

14. The method of claim 13, further comprising playing back, by the graphical user interface code executing on the computing device or by a copy of the graphical user interface code executing on another computing device in response to the testing subsystem using the log of events to initiate the playback, each recorded external interaction with the one or more actionable graphical elements included in the graphical user interface.

15. The method of claim 14, further comprising performing, by the testing subsystem, one or more testing operations in conjunction with the playback of each recorded external interaction with the one or more actionable graphical elements included in the graphical user interface.

16. The method of claim 13, further comprising providing, by the testing subsystem, a testing user interface configured to facilitate user control over the initiation of the playback by the testing subsystem.

17. The method of claim 13, embodied as computer-executable instructions on at least one non-transitory computer-readable medium.

18. A non-transitory computer-readable medium including graphical user interface code configured to instruct a processor to:

provide a graphical user interface including one or more graphical elements;

expose data representative of one or more graphical element type identifiers indicating one or more types of the one or more graphical elements for access and use by a testing subsystem to test the graphical user interface, wherein the exposing comprises:

generating a log of events associated with the graphical user interface, the log of events including the data representative of the one or more graphical element type identifiers indicating the one or more types of the one or more graphical elements, and providing data representative of the log of events for access by the testing subsystem;

detect, by the graphical user interface code executing on the computing device, one or more interactions with the graphical user interface, wherein the log of events specifies the detected one or more interactions with the graphical user interface;

access, by the testing subsystem, data representative of the log of events;

determine, by the testing subsystem from the log of events, the detected one or more interactions with the graphical user interface; and provide, by the testing subsystem to either the graphical user interface code executing on the computing device or a copy of the graphical user interface code executing on another computing device, one or more messages configured to cause the graphical user interface code to play back the detected one or more interactions with the graphical user interface.

* * * * *